United States Patent Office 3,328,005
Patented June 27, 1967

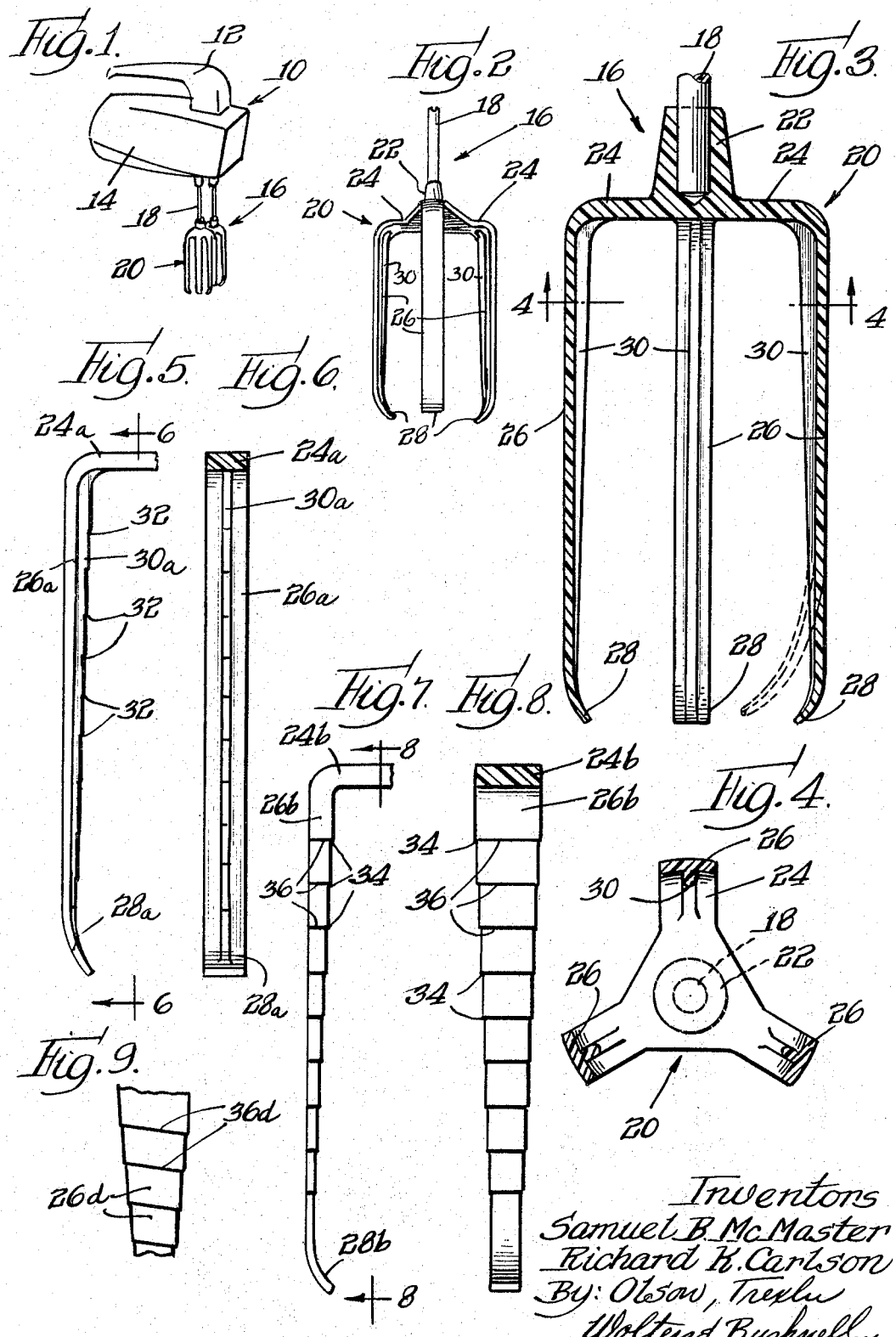

3,328,005
PLASTIC BEATER FOR FOOD AND DRINK MIXERS
Samuel B. McMaster, Deerfield, and Richard K. Carlson, Chicago, Ill., assignors to G-M Laboratories Inc., Chicago, Ill., a corporation of Illinois
Filed Oct. 22, 1965, Ser. No. 502,155
6 Claims. (Cl. 259—144)

ABSTRACT OF THE DISCLOSURE

A plastic beater for food and drink mixers of increasing flexibility from top to bottom to promote conformity in shape with a mixing vessel, and provided with radially inwardly directed ribs to enhance mixing.

This invention relates generally to domestic food and drink mixing apparatus, and especially to the beaters employed in such apparatus.

Heretofore it has been common practice in both electrically and manually operated domestic food and drink mixing apparatus to include rotatable shafts and beater elements made of chrome-plated steel. Such beater elements have generally had four blades joined at the top and bottom to a rod adapted to be or permanently coupled to a rotatable shaft.

Beater elements so constructed and arranged have been notoriously difficult to clean, due to the sharp corners, points, and overlaps presented. When such prior art beaters have been used in conjunction with glass or china vessels, mixing of ingredients disposed near the sides and bottom of the vessel has frequently been quite poor because of reticence on the part of the operator to allow the metal blades to clash against the walls of the mixing vessel. In the now popular Teflon coated cookware it is impossible to use metal beaters due to damage to the Teflon coating. As a further drawback to the conventional metal beater elements, the chrome-plated steel beaters have been expensive to manufacture, and once bent or otherwise deformed, they are virtually useless.

In the prior, copending application filed in the name of Samuel B. McMaster and Richard K. Carlson, Ser. No. 81,412, filed Jan. 9, 1961 now Patent No. 3,215,410 for "Plastic Beater for Food and Drink Mixers" a superior plastic beater obviating the above noted difficulties of the prior art is disclosed and claimed. In particular, the beater blades have been three in number and have been free at the lower ends so that they may flex to conform to the shape of a mixing vessel. An important feature of the prior invention is that the blades taper from the end fixed to the rod to the free ends, whereby there is a gradually changing section modulus which results in a more favorable distribution of stress at the time the beater blade is deflected at the end to conform to the mixing vessel.

It is an object of the present invention to attain the advantages of the invention in the above noted McMaster and Carlson application while providing a superior mixing action.

More particularly it is an object of this invention to provide a plastic beater having blades with radially extending flanges thereon for augmenting mixing action.

More specifically, it is an object of this invention to provide a plastic beater having blades each with a main body of constant cross section but with a radially extending fin or flange or rib tapering from a maximum at the top to the minimum toward the bottom to impart a gradually changing section modulus.

A further object of the present invention, in a modified form thereof, is to provide a plastic beater wherein each blade has a step function of cross section to produce a gradually step-wise change in section thickness and section modulus.

Other and further objects and advantages of the present invention will be apparent with reference to the following disclosure and the drawing forming a part thereof wherein:

FIG. 1 is a perspective view of an electric hand mixer incorporating plastic beaters constructed in accordance with the present invention;

FIG. 2 is a side perspective view of one of the beaters;

FIG. 3 is a longitudinal sectional view through one of the beaters;

FIG. 4 is an upwardly looking horizontal cross sectional view as taken along the line 4—4 in FIG. 3;

FIG. 5 is a fragmentary longitudinal sectional view similar to FIG. 3 and showing a modification of the invention;

FIG. 6 is a view taken at right angles to FIG. 5 along the line 6—6 in FIG. 5;

FIG. 7 is a view similar to FIG. 5 showing a further modification of the invention;

FIG. 8 is a view taken at right angles to FIG. 7 along the line 8—8 in FIG. 7; and FIG. 9 is similar to a portion of FIG. 8, showing a modification.

Referring now in greater particularity to the drawings, the first to FIG. 1, there will be seen an electric hand mixer identified generally by the numeral 10. The mixer 10 includes a handle 12, a housing 14, and a pair of beaters 16, each including a shaft 18 and a plastic beater element 20. As will be understood, the housing 14 encloses an electric motor and suitable gearing and other parts normally incorporated in an electric hand mixer. The elements enclosed within the housing do not comprise a part of the present invention, and they therefore are not illustrated in detail or described herein. Indeed, it will be understood that the invention, which resides in the beaters, could be used equally well with a hand operated or manual mixer, or in a base mounted electric mixer, rather than in the portable electric mixer shown.

Reference now should be had to FIGS. 2–4, wherein the shaft 18 of each beater 16 is shown as being inserted in a boss or hub 22 forming a part of the beater element 20. The beater element is of molded plastic construction, nylon being one satisfactory example, and the shaft 18 is of metal. However, it will be understood that the shaft also could be of plastic construction and molded integrally with the beater element, instead of being inserted. In the illustrative example the shaft forms a press fit in the hub, and preferably is also splined or otherwise keyed to the beater element.

Radiating from the hub 22 is a plurality of arms 24, there being three such arms in the illustrative embodiment. Each of the arms 24 has a depending integral blade 26, the blades being in more or less parallel relationship and lying on the surface of a cylinder. Each blade 26 has an inwardly curved, flexible tip 28. As will be seen in FIG. 3 the tip and adjacent part of the blade 26 are adapted to flex into the broken line position shown upon impingement against the side of a mixing bowl or the like.

Each of the plades 26 is of uniform radial thickness, and is of uniform width in a circumferential direction. In order to provide for increasing flexibility toward the tips 28 each blade is provided on its radially inner face, preferably on the center line thereof, with a tapering rib, fin or flange 30. As will be seen, each rib 30 is of maximum radial extent at the top of the corresponding blade 26, and tapers uniformly in decreasing radial dimension from top to bottom of the blade. Thus, although the main body of each blade is of uniform cross sectional dimensions, the tapered rib forming a part of each blade imparts increased flexibility to the blades toward the free ends or tips thereof. This provides for a desirable flexibility to the blades, all as disclosed and claimed in the aforementioned McMaster and Carlson application. However, there is an additional benefit in the present invention.

As observed heretofore the hub 22, arms 24, and blades 26 including the ribs 30 thereon are integral, preferably being molded of a suitable resinous plastic material. Nylon has been mentioned as one example, and it will also be understood that the physical, mechanical and chemical properties of polyamide resins eminently fit these materials for use in fabricating the beater element 18. One such material comprising a polymerized formaldehyde acetal resin available commercially under the trademark "Delrin" has proved particularly useful.

Delrin is particularly good also in resisting stains and deformation in boiling or otherwise hot water. It is sufficiently dimensionally stable that a good press fit with the shaft 18 can be maintained. The overall desired rigidity of the beater element is exemplary, while yet the desired flexibility of the blades 26, particularly at and adjacent to tips 28 thereof is attained. It will be observed that the open end of the bottom of the beater element facilitates cleaning thereof, and it will be apparent that the flexibility obtained would not be possible without the open end.

It further will be observed that the ribs 30 act in the nature of paddles 30 perpendicular to the direction of movement of the blades 26, thereby materially augmenting the stirring or mixing action of the blades. Hence, a superior mix in shorter time is easily obtained.

A modification of the invention is shown in FIGS. 5 and 6. The structure is in the main identical with that heretofore shown and described, and prolixity of description is avoided by utilizing similar numerals for like parts with the addition of the suffix a. The essential difference is that the rib 30a on each blade 26a is not uniformly tapered, but is tapered as a step function, steps or shoulders being indicated at 32. A similar result is obtained in that structural properties are substantially uniformly distributed along the length of the blade, thus providing a flexible, yet strong structure.

A further modification is shown in FIGS. 7 and 8, prolixity of description again being avoided by utilizing similar numerals to identify like parts with the addition of the suffix b. The difference in the present embodiment of the invention is that the blade does not have a discrete rib. Rather, the entire body of the blade is decreased both radially and circumferentially in steps as indicated at 34 radially and 36 circumferentially. A somewhat similar result is obtained, again providing a step function of flexibility and a good distribution of stress. As is indicated at 36d in FIG. 9, the circumferential steps can be somewhat skewed, whether to left or right depends on the direction of rotation of the beater, in order to produce a swirling effect in the material being mixed, and thereby to promote more efficient mixing.

It will be observed that in all of the embodiments of the invention, there is something other than a smooth inside surface to each blade. In FIGS. 2-4 there is an inwardly directed rib. There is also an inwardly directed rib in FIGS. 5 and 6 with shoulders thereon, and there are also shoulders in FIGS. 7-9. All of these non-smooth inward projections can under various circumstances promote a superior mixing action.

The several examples of the invention as herein shown and described are for illustrative purposes only. Various changes in structure will doubtless occur to those skilled in the art, and will be understood as forming a part of the present invention as they fall within the spirit and scope of the appended claims.

The invention is claimed as follows:

1. A beater for food and drink mixers comprising a hub adapted to be fixed to an output shaft, and a plurality of flexible and resilient blades joined to said hub and spaced radially outwardly from the axis of rotation of said hub and then downwardly and without encompassing framework, and said blades being elongate relative to said radial spacing and decreasing in cross section toward the lower ends thereof for increased flexibility and having radially inward projections for promoting agitation of material being beat by said blades, each such projection comprising an elongated rib integral from one end to the other thereof with a respective blade, each rib decreasing in radial dimension and in cross section from near the upper end of a blade adjacent said hub toward the lower end thereof, said blades having free tips at the lower ends thereof enabling the blades generally to conform and to make wiping contact with interior surface portions of a mixing receptacle.

2. A beater for food and drink mixers comprising a hub adapted to be fixed to an output shaft, and a plurality of flexible and resilient blades joined to said hub and spaced radially outwardly from the axis of rotation of said hub and then downwardly and without encompassing framework, and said blades being elongate relative to said radial spacing and decreasing in cross section toward the lower ends thereof for increased flexibility and having radially inward projections for promoting agitation of material being beat by said blades, said blades having free tips at the lower ends thereof enabling the blades generally to conform and to make wiping contact with interior surface portions of a mixing receptacle, the radially inward projections comprising an elongated rib on each blade forming an integral part thereof, each said rib decreasing in radial dimension and in cross section stepwise having a plurality of shoulders thereon from the end adjacent the hub toward the free tip at the lower end.

3. A beater for food and drink mixers comprising a hub adapted to be fixed to an output shaft, and a plurality of flexible and resilient blades joined to said hub and spaced radially outwardly from the axis of rotation of said hub and then downwardly and without encompassing framework, and said blades being elongate relative to said radial spacing and decreasing in cross section toward the lower ends thereof for increased flexibility and having radially inward projections for promoting agitation of material being beat by said blades, said blades having free tips at the lower ends thereof enabling the blades generally to conform and to make wiping contact with interior surface portions of a mixing receptacle, the inward projections comprising a plurality of shoulders providing the decrease in cross section.

4. A beater as set forth in claim 3 wherein the shoulders are skewed relative to the longitudinal dimension of each blade.

5. A beater for food and drink mixers comprising a hub adapted to be fixed to an output shaft, and a plurality of flexible and resilient blades joined to said hub and spaced radially outward from the axis of rotation of said hub and then downwardly and without encompassing framework, said blades being elongate relative to said radial spacing and having radially extending longitudinal ribs thereon, each rib decreasing in radial dimension from top to bottom free of any increase in radial dimension and the cross section of each blade including the rib thereon thereby decreasing in cross section toward the lower end thereof for increased flexibility, each blade having a free tip at the lower end thereof enabling the blades to conform generally and to make wiping contact with interior surface portions of a mixing receptacle.

6. A beater for food and drink mixers comprising a hub adapted to be fixed to an output shaft, and a plurality of flexible and resilient blades joined to said hub and spaced radially outwardly from the axis of rotation of said hub and then downwardly and without encompassing framework, said blades being elongate relative to said radial spacing and decreasing step-wise in cross section toward the lower ends thereof presenting a plurality of downwardly facing shoulders for increased flexibility and having free tips at said lower ends thereof enabling the blades to conform generally and to make wiping contact with interior surface portions of a mixing receptacle.

References Cited

UNITED STATES PATENTS

| | | | |
|---|---|---|---|
| 2,715,519 | 8/1955 | Schwalbe | 259—135 |
| 2,782,014 | 2/1957 | DeVault | 259—131 |
| 3,215,410 | 11/1965 | McMaster et al. | 259—134 X |

WILLIAM I. PRICE, *Primary Examiner.*